(12) United States Patent
Grubert et al.

(10) Patent No.: US 8,211,392 B2
(45) Date of Patent: Jul. 3, 2012

(54) DIESEL OXIDATION CATALYST COMPOSITE WITH LAYER STRUCTURE FOR CARBON MONOXIDE AND HYDROCARBON CONVERSION

(75) Inventors: Gerd Grubert, Hannover (DE); Torsten Neubauer, Langenhagen (DE); Alfred H. Punke, Schwuelper (DE); Torsten W. Müller-Stach, Hannover (DE); Attilio Siani, Hannover (DE); Stanley A. Roth, Yardley, PA (US); Jeffrey B. Hoke, North Brunswick, NJ (US); Shiang Sung, New York, NY (US); Yuejin Li, Edison, NJ (US); Xinyi Wei, Princeton, NJ (US); Michel Deeba, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 339 days.

(21) Appl. No.: 12/686,817

(22) Filed: Jan. 13, 2010

(65) Prior Publication Data

US 2010/0180581 A1      Jul. 22, 2010

Related U.S. Application Data

(60) Provisional application No. 61/145,367, filed on Jan. 16, 2009.

(51) Int. Cl.
*B01D 53/94* (2006.01)
*B01J 23/44* (2006.01)
*B01J 35/00* (2006.01)
*F01N 3/10* (2006.01)

(52) U.S. Cl. ............... 423/213.2; 423/213.5; 423/213.7; 60/299; 502/60; 502/73; 502/325; 502/400; 502/527.12; 502/527.13

(58) Field of Classification Search ............ 60/299; 423/213.2, 213.5, 213.7; 502/60, 73, 325, 502/400, 527.12, 527.13
See application file for complete search history.

(56) References Cited

U.S. PATENT DOCUMENTS

| | | | |
|---|---|---|---|
| 4,329,162 A | 5/1982 | Pitcher, Jr. | |
| 4,335,023 A | 6/1982 | Dettling et al. | |
| 4,929,581 A | 5/1990 | Steinwandel et al. | |
| 4,961,917 A | 10/1990 | Byrne | |
| 5,125,231 A | 6/1992 | Patil et al. | |
| 5,202,299 A | 4/1993 | Symons et al. | |
| 5,407,880 A | 4/1995 | Ikeda et al. | |
| 5,462,907 A | 10/1995 | Farrauto et al. | |
| 5,491,120 A | 2/1996 | Voss et al. | |
| 5,516,497 A | 5/1996 | Speronello et al. | |
| 5,627,124 A | 5/1997 | Farrauto et al. | |
| 5,772,972 A | 6/1998 | Hepburn et al. | |

(Continued)

FOREIGN PATENT DOCUMENTS

EP          0782880 A1      7/1997

(Continued)

*Primary Examiner* — Timothy Vanoy
(74) *Attorney, Agent, or Firm* — Melanie L. Brown

(57) ABSTRACT

Provided is a catalyst composition, in particular a diesel oxidation catalyst, for the treatment of exhaust gas emissions, such as the oxidation of unburned hydrocarbons (HC), and carbon monoxide (CO). More particularly, the present invention is directed to a catalyst structure comprising at least two, specifically three distinct layers, at least one of which contains an oxygen storage component (OSC) that is present in a layer separate from the majority of the platinum group metal (PGM) components, such as palladium and platinum.

20 Claims, 1 Drawing Sheet

U.S. PATENT DOCUMENTS

| | | | |
|---|---|---|---|
| 5,884,473 A * | 3/1999 | Noda et al. | 60/274 |
| 6,047,544 A | 4/2000 | Yamamoto et al. | |
| 6,093,378 A | 7/2000 | Deeba et al. | |
| 6,110,862 A | 8/2000 | Chen et al. | |
| 6,171,556 B1 | 1/2001 | Burk et al. | |
| 6,274,107 B1 | 8/2001 | Yavuz et al. | |
| 6,444,610 B1 | 9/2002 | Yamamoto | |
| 6,471,924 B1 | 10/2002 | Feeley et al. | |
| 6,667,018 B2 | 12/2003 | Noda et al. | |
| 6,677,264 B1 | 1/2004 | Klein et al. | |
| 6,708,484 B2 | 3/2004 | Onodera et al. | |
| 7,189,376 B2 | 3/2007 | Kumar et al. | |
| 7,246,488 B2 | 7/2007 | Takaya et al. | |
| 7,250,385 B1 | 7/2007 | Ohno et al. | |
| 2003/0061860 A1 | 4/2003 | Hu et al. | |
| 2007/0191219 A1 | 8/2007 | Fujita et al. | |
| 2008/0045405 A1 | 2/2008 | Beutel et al. | |
| 2008/0219906 A1 | 9/2008 | Chen et al. | |
| 2010/0180581 A1 * | 7/2010 | Grubert et al. | 60/297 |
| 2010/0186375 A1 * | 7/2010 | Kazi et al. | 60/274 |

FOREIGN PATENT DOCUMENTS

| | | |
|---|---|---|
| WO | WO-2008/042084 A1 | 4/2008 |

* cited by examiner

DIESEL OXIDATION CATALYST COMPOSITE WITH LAYER STRUCTURE FOR CARBON MONOXIDE AND HYDROCARBON CONVERSION

CROSS-REFERENCE TO RELATED APPLICATIONS

This application claims the benefit of priority under 35 U.S.C. §119(e) to U.S. Provisional Application Ser. No. 61/145,367, filed Jan. 16, 2009, which is incorporated herein by reference.

TECHNICAL FIELD

This is directed to a layered diesel oxidation catalyst composite for the treatment of exhaust gas emissions from a diesel engine and a method for treating a diesel exhaust gas stream. More particularly, the present invention is directed to a catalyst structure comprising at least two, preferably three distinct layers. At least one of the layers contains an OSC component that is separated from the majority of the catalytically active precious metal component, for example, a platinum group metal (PGM) component such as platinum. Another layer contains a molecular sieve, such as a zeolite, that is separated from palladium.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

Oxidation catalysts comprising precious metals such as platinum group metals (PGM) dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel powered engine to treat the exhaust before it vents to the atmosphere. Typically, the diesel oxidation catalysts are formed on ceramic or metallic substrate carriers upon which one or more catalyst coating compositions are deposited. In addition to the conversions of gaseous HC, CO and the SOF fraction of particulate matter, oxidation catalysts that contain platinum group metals (which are typically dispersed on a refractory oxide support) promote the oxidation of nitric oxide (NO) to $NO_2$.

For example U.S. Pat. No. 5,491,120 discloses oxidation catalysts containing ceria and a bulk second metal oxide which may be one or more of titania, zirconia, ceria-zirconia, silica, alumina-silica and alpha-alumina.

U.S. Pat. No. 5,627,124 discloses oxidation catalysts containing ceria and alumina. It is disclosed that each have a surface area of at least about 10 $m^2/g$. The weight ratio of ceria to alumina is disclosed to be 1.5:1 to 1:1.5. It is further disclosed to optionally include platinum. The alumina is disclosed to preferably be activated alumina. U.S. Pat. No. 5,491,120 discloses oxidation catalysts containing ceria and a bulk second metal oxide, which may be one or more of titania, zirconia, ceria-zirconia, silica, alumina-silica and alpha-alumina.

The prior art also shows an awareness of the use of zeolites, including metal-doped zeolites, to treat diesel exhaust. For example, U.S. Pat. No. 4,929,581 discloses a filter for diesel exhaust, in which the exhaust is constrained to flow through the catalyst walls to filter the soot particles. A catalyst comprising a platinum group metal-doped zeolite is dispersed on the walls of the filter to catalyze oxidation of the soot to unplug the filter.

US 2008/045405 discloses a diesel oxidation catalyst for the treatment of exhaust gas emissions, such as the oxidation of unburned hydrocarbons, and carbon monoxide and the reduction of nitrogen oxides. More particularly, US 2008/045405 is directed to a washcoat composition comprising two distinct washcoat layers containing two distinctly different weight ratios of Pt:Pd.

The state of the art discloses various catalyst compositions for catalyzed soot filters (CSF). For example US 2007/191219 discloses a catalytic material for removing diesel particulates, which comprises a composite oxide which contains zirconium as a primary component and a rare-earth metal except for cerium and yttrium. The composite oxide has a crystallite diameter of 13 nm to 40 nm.

U.S. Pat. No. 7,250,385 discloses a catalyst formed by covering each surface of particles in a ceramic support with an alumina thin film and holding an active catalyst component with the surface of the thin film, which is large in the pore size and porosity and small in the pressure loss irrespectively of forming the alumina thin film on the surface and is produced, for example, by immersing the ceramic support in an aluminum-containing metallic compound, preliminarily firing, immersing in hot water, drying, firing and finally holding the active catalyst component on the alumina thin film on the surface of the support.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, see for example U.S. Pat. No. 5,125,231 which discloses the use of platinum group metal-doped zeolites as low temperature hydrocarbon adsorbents as well as oxidation catalysts.

As discussed hereinabove, oxidation catalysts comprising a platinum group metal (PGM) dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, one of the major advantages of using palladium (Pd) based catalysts is the lower cost of Pd compared to Pt. However, Pd based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions.

As emissions regulations become more stringent, there is a continuing goal to develop diesel oxidation catalyst (DOC) systems that provide improved performance, for example, light-off performance. Consequently the present invention is directed to a diesel oxidation catalyst with a layer design in order to maximize the hydrocarbon storage capacity without sacrificing the catalytic activity of the catalyst. There is also a goal to utilize components of DOCs, for example, the zeolites, ceria, and palladium, as efficiently as possible.

SUMMARY

Provided are exhaust systems and components and methods of using the same that use a diesel oxidation catalytic material on a support. The support can be a flow-through design used for a diesel oxidation catalyst (DOC) or wall-flow design used for a catalyzed soot filter. In a first aspect, provide is a layered diesel oxidation catalyst composite for the treatment of exhaust gas emissions from a diesel engine comprising: a diesel oxidation catalytic material a carrier, the catalytic material comprising a palladium component, and at least two layers:

a hydrocarbon trap layer comprising at least one molecular sieve, the hydrocarbon trap layer being substantially free of palladium;

a palladium-containing layer that comprises the palladium component, and is substantially free of a molecular sieve and is substantially free of an oxygen storage component, wherein the palladium component is located on a high surface area, refractory metal oxide support;

wherein the catalytic material optionally further comprises an undercoat layer located on the carrier and below the at least two layers; and wherein the catalytic material further comprises an oxygen storage component that is located in at least one of the hydrocarbon trap and the optional undercoat layers.

Another aspect provides a method of treating a gaseous exhaust stream of a diesel engine, the exhaust stream including hydrocarbons, carbon monoxide, and other exhaust gas components, the method comprising: contacting the exhaust stream with the layered diesel oxidation catalyst composites according to embodiments of the present invention. Other methods can further include directing the diesel exhaust gas stream one or more to a soot filter located downstream of the diesel oxidation catalyst composite and a selective catalytic reduction (SCR) catalytic article located upstream or downstream of the catalyzed soot filter (CSF).

A further aspect provides a system for treatment of a diesel engine exhaust stream including hydrocarbons, carbon monoxide, and other exhaust gas components, the emission treatment system comprising: an exhaust conduit in fluid communication with the diesel engine via an exhaust manifold; the diesel oxidation catalyst composite according to embodiments of the present invention wherein the carrier is a flow through substrate or a wall-flow substrate; and one or more of the following in fluid communication with the composite: a soot filter, a selective catalytic reduction (SCR) catalytic article and a NOx storage and reduction (NSR) catalytic article.

DETAILED DESCRIPTION

Figure 1:
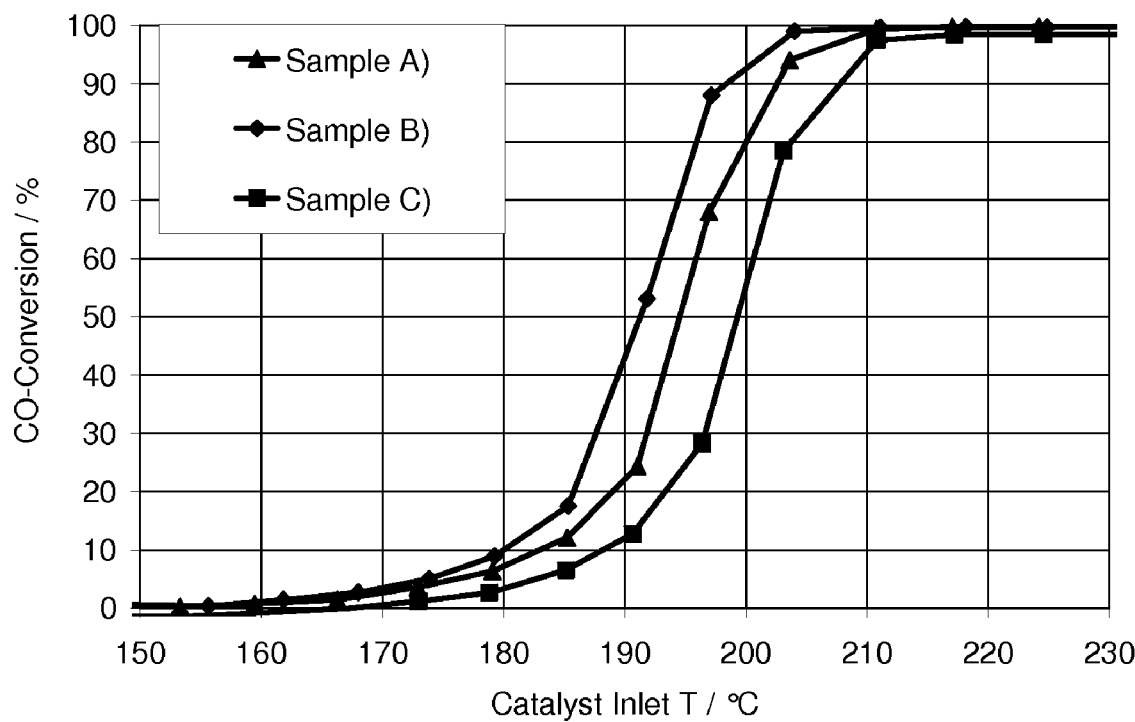
FIG. 1 provides a graph of carbon monoxide conversion data.

Provided are diesel exhaust systems and components where palladium is segregated from a molecular sieve such as a zeolite in a catalytic material and an oxygen storage component (OSC) is segregated from the majority of the precious metal components such as palladium and platinum. In the catalytic material, therefore, there are at least two layers: a palladium-containing layer that is substantially free of zeolites and a hydrocarbon trap layer that comprises at least one zeolite and is substantially free of palladium. An optional undercoat is also provided. The OSC can reside in either the hydrocarbon trap layer or the undercoat or both to keep it away from the majority of the precious metal components, which are located in the palladium-containing layer. Separating the OSC from the majority of the platinum component minimizes the loss of platinum effectiveness due to possible poisoning of the platinum by the OSC under the diesel oxidation conditions.

Separating the palladium from the zeolite is intended to enhance effectiveness of the palladium and minimize the loss in CO and HC light-off activity due to possible silica poisoning of precious metals (i.e., palladium) or precious metal (e.g., palladium) migration to the zeolite surface. It has been found that the removal of palladium from the zeolite-containing layer provides excellent light-off performance. It is also advantageous to separate almost all (e.g., >80%, 85%, 90%, or even 95%) of the precious metal components from the zeolite. In addition, the use of a porous high surface area refractory metal oxide support for the palladium and platinum in the absence of a zeolite also provides excellent light-off performance. The use of a high surface area, refractory metal oxide support (substantially free of precious metals) in an under-layer also leads to improvements in light-off at high conversions.

Such catalysts are effective to oxidize hydrocarbons (HC) and carbon monoxide (CO) emitted from a diesel engine, the zeolite of the hydrocarbon trap layer being active for adsorbing HC under conditions associated with diesel engine and the precious metals such a platinum and palladium being active for oxidation of the HC and CO of the diesel exhaust.

Reference to a catalyst composite means a catalytic article including a carrier substrate, for example a honeycomb substrate, having one or more washcoat layers containing a catalytic component, for example, a precious group metal component that is effective to catalyze the oxidation of HC, CO and/or $NO_x$.

Reference to "essentially no," "essentially free," and "substantially free" means that the material recited is not intentionally provided in the recited layer. It is recognized, however, that the material may migrate or diffuse to the recited layer in minor amounts considered to be insubstantial (that is <10% of the material, 9%, 8%, 7%, 6%, 5%, 4%, 3%, 2%, or even 1%). As used herein, therefore, a "layer substantially free of a microporous material" (for example, a zeolite material) is a layer containing no more than 10 wt % of a microporous material or is completely free of a microporous material. However, according to the present invention the term "layer substantially free of a microporous material" does not exclude that the porous material which may be present in a layer being macro- or meso-porous (for example, an alumina material) contains a small amount of microporous material.

High surface refractory metal oxide supports refer to support particles having pores larger than 20 Å and a wide pore distribution. As defined herein, such metal oxide supports exclude molecular sieves, specifically, zeolites. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Desirably, the active alumina has a specific surface area of 60 to 350 $m^2/g$, and typically 90 to 250 $m^2$ g. The loading on the refractory oxide support is preferably from about 0.1 to about 6 $g/in^3$, more preferably from about 2 to about 5 $g/in^3$ and most preferably from about 3 to about 4 $g/in^3$.

As used herein, molecular sieves, such as zeolites, refer to materials, which may in particulate form support catalytic precious group metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

Reference to OSC (oxygen storage component) refers to an entity that has multi-valence state and can actively store and release oxygen under exhaust conditions. Typically, an oxygen storage component will comprise one or more reducible oxides of one or more rare earth metals. Examples of suitable oxygen storage components include ceria. Praseodymia can also be included as an OSC or a promoter.

Preferably, the catalyst is a diesel oxidation catalyst (DOC) or a catalyzed soot filter (CSF). Therefore, the present invention also relates to a diesel oxidation catalyst for the treatment of exhaust gas emissions from a diesel engine at least comprising: (a) a carrier substrate; (b) at least one layer (LO) comprising at least one oxygen storage compound; (c) at least one layer (LC) comprising at least one catalytically active PGM component.

According to an alternative embodiment, the present invention relates to a catalyzed soot filter for the treatment of exhaust gas emissions from a diesel engine at least comprising: (a) a carrier substrate; (b) at least one layer (LO) comprising at least one oxygen storage compound; (c) at least one layer (LC) comprising at least one catalytically active PGM component.

The catalyst composition according to the present invention comprises at least two separate layers on a carrier substrate, wherein one layer (LO) comprises at least one oxygen storage compound and the other layer (LC) comprises at least one catalytically active PGM component. The layer (LO) has a high oxygen storage capacity and gives additional conversion efficiency. Due to the separation of the layers the layer (LC) has high conversion efficiency without negative interference between the catalytically active PGM component and the oxygen storage compound.

The catalyst composition according to the present invention comprises at least two separate layers (LO) and (LC). According to the present invention, it is possible that the layer (LC) comprising at least one catalytically active PGM component is coated on the carrier substrate and the layer (LO) comprising at least one oxygen storage compound is coated over the layer (LC). However, it is also possible that the layer (LO) comprising at least one oxygen storage compound is coated on the carrier substrate and the layer (LC) comprising at least one catalytically active PGM component is coated over the layer (LO).

According to the present invention, the catalyst composition can also comprise further layers. In particular, it is possible that the catalyst composition comprises two or more layers (LO), preferably two layers (LO) comprising at least one oxygen storage compound.

Therefore, according to one embodiment, the present invention is directed to a catalyst composition as disclosed above, wherein the catalyst composition comprises two layers (LO-1) and (LO-2) comprising at least one oxygen storage compound.

Preferably, the catalyst composition according to the present invention comprises at least one layer (LC) comprising at least one catalytically active PGM component and two layers (LO-1) and (LO-2) each comprising at least one oxygen storage compound. Further preferred, the layer (LC) is arranged between the two layers (LO-1) and (LO-2).

Thus, according to one embodiment, the present invention is directed to a catalyst composition as disclosed above, at least comprising: (a) a carrier substrate; (b) a layer (LO-1) comprising at least one oxygen storage compound coated on said carrier substrate; (c) a layer (LC) comprising at least one catalytically active PGM component coated over said layer (LO-1); (d) a layer (LO-2) comprising at least one oxygen storage compound coated over said layer (LC).

The catalyst composition according to the present invention can also comprise further layers. These layers can be arranged in any order and can also be intermediate layers between any of the layers disclosed above.

The catalyst composition of the present invention comprises a carrier substrate. In principle, any suitable carrier substrate known to the person skilled in the art can be used in the context of the present invention.

According to the present invention, the catalyst composition of the present invention is disposed on a carrier substrate. In particular for diesel oxidation catalysts, the substrate may be any of those materials typically used for preparing catalysts, and will preferably comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

For a catalyzed soot filter, the substrate may be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 50% and have a mean pore size of at least 10 microns. When substrates with these porosities and these mean pore sizes are coated with the techniques described below, adequate levels of the CSF catalyst compositions can be loaded onto the substrates to achieve excellent NOx conversion efficiency and burning off of soot. These substrates are still able to retain adequate exhaust flow characteristics, i.e., acceptable back pressures, despite the CSF catalyst loading. Suitable wall flow substrates are for example disclosed in U.S. Pat. No. 4,329,162.

The porous wall flow filter used according to the present invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or within the wall itself may consist all, or in part, of the catalytic material. In another embodiment, this invention may include the use of one or more washcoat layers of catalytic materials and combinations of one or more layers of catalytic materials on the inlet and/or outlet walls of the element.

Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

A suitable ceramic substrate may be made of any suitable refractory material, e.g., cordierite, cordierite-alumina, silicon nitride, silicon carbide, zircon mullite, spodumene, alumina-silica magnesia, zircon silicate, sillimanite, a magnesium silicate, zircon, petalite, alumina, an aluminosilicate and the like.

The carrier substrates useful for the catalyst composition of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10 to 25 wt % of chromium, 3 to 8 wt % of aluminum and up to 20 wt % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

Useful high-surface area supports include one or more refractory oxides. These oxides include, for example, silica and alumina, titania and zirconia include mixed oxide forms such as silica-alumina, aluminosilicates which may be amorphous or crystalline, alumina-zirconia, alumina-ceria and the like and titanium-alumina and zirconium-silicate. In one embodiment, the support is preferably comprised of alumina which preferably includes the members of the gamma, delta, theta or transitional aluminas, such as gamma and eta aluminas, and, if present, a minor amount of other refractory oxide, e.g., about up to 20 weight percent. Desirably, the active alumina has a specific surface area of 60 to 350 m$^2$/g, and typically 90 to 250 m$^2$ g. The loading on the refractory oxide support is preferably from about 0.1 to about 6 g/in$^3$, more preferably from about 0.5 to about 5 g/in$^3$ and most preferably from about 2 to about 4 g/in$^3$ for the DOC and from about 0.2 to about 1.0 g/in$^3$ for the CSF.

According to the present invention the layer (LC) of the catalyst composition according to the present invention comprises at least one catalytically active PGM component. In principle, any suitable catalytically active component can be used. Preferably, the catalytically active component is at least one metal of the platinum group metals (PGM), e.g. at least one metal selected from Pt, Pd, Rh, Au, and/or Ir. In the context of the present invention, it is also possible that the catalytically active component comprises two or more metals of the platinum group metals, in particular Pd and Pt.

Therefore, according to a further embodiment, the present invention is directed to the catalyst composition as disclosed above, wherein the catalytically active component is at least one metal of the platinum group metals. According to a further embodiment, the present invention is directed to the catalyst composition as disclosed above, wherein the catalytically active component is at least one metal selected from Pt, Pd, Rh, Au, and Ir. According to one embodiment, the present invention is directed to the catalyst composition as disclosed above, wherein the catalytically active component contains Pt and Pd.

It is also possible, that the layer (LC) additionally comprises a porous support material. In particular it is possible according to the present invention that the layer (LC) comprises the catalytically active PGM component, in particular Pt and Pd dispersed on a porous support material.

Therefore, according to a further embodiment, the present invention is directed to the catalyst composition as disclosed above, wherein the layer (LC) comprises Pt and Pd on a porous support material.

Suitable porous support materials are known to the person skilled in the art. The porous support material of the layer (LC) is preferably a base metal oxide and/or transition metal oxide which is selected from the group including compounds of silica, alumina, zirconia, ceria, titania and mixtures thereof. Particularly preferred supports are activated, high-surface area compounds selected from the group consisting of alumina, silica, titania, zirconia, ceria, silica-alumina, alumina-zirconia, alumina-chromia, alumina-ceria zirconium-silicate and titania-alumina. In particular preferred are $Al_2O_3$, $ZrO_2$, $CeO_2$ or $SiO_2$ as well as mixtures thereof.

Preferably, the porous support material is a material with a porosity between 0.2 to 1.2 mL/g, preferable between 0.6 and 1.0 mL/g. The porous support material preferably has a BET surface area between 30 and 300 $m^2$/g, more preferably between 70 and 200 $m^2$/g. g and the average pore diameter is in the range of 70 Å to 150 Å.

The catalyst composition of the present invention can comprise Pt and Pd in different ratios. According to one embodiment, the catalyst composition may comprise Pt and Pd in a ratio Pt/Pd from about 1/10 to about 10/1, preferably from about 1/2 to about 4/1, in particular of around 1/1. According to an alternative embodiment, the catalyst composition may comprise Pt and Pd in a ratio Pt/Pd of around 2/1.

The total loading of the catalyst composition may range from about 1 to 300 $g/ft^3$ preferably from about 10 to about 200 $g/ft^3$ for a diesel oxidation catalyst and from about 1 to about 100 $g/ft^3$ for a catalyzed soot filter.

According to the present invention, also the layer (LO) or the layers (LO-1) and/or (LO-2) may comprise catalytically active components, in particular Pt and/or Pd. Therefore, according to one embodiment, the present invention is directed to the catalyst composition as disclosed above, wherein the layer (LO) additionally comprises Pt or Pd or Pt and Pd.

In case the catalyst composition according to the present invention comprises two layers (LO-1) and (LO-2), one or both of the layers may comprise a catalytically active component. For example layer (LO-1) may comprise Pd and layer (LO-2) may comprise no catalytically active component. However, it is also possible that layer (LO-1) may comprise no catalytically active component and layer (LO-2) additionally comprises Pt or Pd or Pt and Pd. Thus, according to one embodiment, the present invention is directed to the catalyst composition as disclosed above, wherein the layer (LO-1) additionally comprises Pd.

According to a further preferred embodiment, the present invention is directed to the catalyst composition as disclosed above, wherein the layer (LO-2) additionally comprises Pt or Pd or Pt and Pd.

In case the catalyst composition comprises Pt and Pd in a ratio Pt/Pd of around 1/1, the layer (LC) preferably comprises Pt and Pd in a ratio Pt/Pd of from 1.5 to 2.5, in particular of from 1.7 to 2.3. Preferably, the layer (LO), in particular the layer (LO-1) additionally comprises Pd in this case. Thus, according to one embodiment, the present invention is directed to the catalyst composition as disclosed above, wherein the layer (LC) comprises Pt and Pd in a ratio Pt/Pd of from 1.5 to 2.5.

In case the catalyst composition comprises Pt and Pd in a ratio Pt/Pd of around 2/1, the layer (LC) preferably comprises Pt and Pd in a ratio Pt/Pd of from 1.7 to 2.3, in particular of from 1.9 to 2.1, for example around 2. Preferably, the layer (LO), in particular the layer (LO-1) initially does not comprise additional Pd in this case. However, according to the present invention, it is possible that Pd leaches to the layer (LO), in particular the layer (LO-1) from the layer (LC).

In case Pd is present in layer (LO), in particular the layer (LO-1) the ratio of Pd in the layer (LO), in particular the layer (LO-1) to the total amount of precious group metals, in particular to the total amount of Pt and Pd in the catalyst composition preferably is in the range of from 0.01 to 0.4.

In case Pd is present in layer (LO), in particular the layer (LO-1) the amount of Pd preferably is in the range of from about 1 to 50 $g/ft^3$.

The layer (LO), in particular the layer (LO-1) and (LO-2) may additionally comprise further metals.

In case Pt is present in layer (LO-2) the ratio of Pt in the layer (LO-2) to the total amount of precious group metals, in particular to the total amount of Pt and Pd in the catalyst composition preferably is in the range of from 0.05 to 0.1.

In case Pt is present in layer (LO-2) the amount of Pt preferably is in the range of from about 1 to 50 $g/ft^3$ and more preferably is in the range of from about 2 to 15 $g/ft^3$.

In case Pd is present in layer (LO-2) the ratio of Pd in the layer (LO-2) to the total amount of precious group metals, in particular to the total amount of Pt and Pd in the catalyst composition preferably is in the range of from 0.005 to 0.25.

In case Pd is present in layer (LO-2) the amount of Pd may be in the range of from about 1 to 30 $g/ft^3$ and preferably is in the range of from about 2 to 15 $g/ft^3$.

According to the present invention it is also possible that the layer (LO) or the layers (LO-1) and/or (LO-2) comprise a porous support material. In particular, it is possible, that the Pt and/or Pd which may be comprised in the layer (LO) or the layers (LO-1) and/or (LO-2) is dispersed on a porous support material.

Therefore, according to a further embodiment, the present invention is directed to the catalyst composition as disclosed above, wherein the layer (LO) or the layers (LO-1) and/or (LO-2) comprise Pt on a porous support material or Pd on a porous support material or Pt and Pd on a porous support material.

According to another embodiment, the present invention is directed to the catalyst composition as disclosed above, wherein the layer (LO-1) comprises Pd on a porous support material.

According to the present invention it is also possible that the layer (LO) or the layers (LO-1) and/or (LO-2) comprise a porous support material as such, i.e. without any metal dispersed on it. Suitable porous support materials are mentioned above. Particularly preferred are porous support materials selected from base metal oxides and transition metal oxides, more preferred the porous support material is alumina.

Therefore, according to a further embodiment, the present invention is directed to the catalyst composition as disclosed above, wherein the porous support material is selected from base metal oxides and transition metal oxides.

According to a preferred embodiment, the present invention is directed to the catalyst composition as disclosed above, wherein the porous support material is alumina.

The layer (LO) or the layers (LO-1) and/or (LO-2) of the catalyst composition of the present invention comprise an oxygen storage compound. The layers (LO-1) and (LO-2) can comprise the same oxygen storage compound but also different oxygen storage compounds.

According to the present invention, any suitable oxygen storage compound can be used. Preferred are for example oxygen storage compounds which comprise $ZrO_2$ and/or $CeO_2$.

Therefore, according to a further embodiment, the present invention is directed to the catalyst composition as disclosed above, wherein the oxygen storage compound comprises $ZrO_2$ and/or $CeO_2$.

The oxygen storage compound according to the present invention may also comprise further metals like for example Y, La, Nd, Sm, Pr, and Hf or mixtures thereof.

The layer (LC) of the catalyst composition of the present invention can additionally comprise further components, for example further catalytically active components or promoters. Suitable promoters are known to the person skilled in the art. Preferred promoters are for example alkaline oxides such as BaO, MgO, $La_2O_3$ or mixtures thereof.

Additionally, the layer (LC) may comprise compounds containing Sn, Si or Ti or mixtures thereof.

According to a further embodiment, the catalyst composition of the present invention may additionally comprise a zeolite. The zeolite is preferably present in the layer or layers of the catalyst composition according to the present invention which comprise the oxygen storage compound. Therefore, according to one embodiment, the present invention is directed to the catalyst composition as disclosed above, wherein the layer (LO) additionally comprises a zeolite. According to a preferred embodiment, the present invention is also directed to a catalyst composition as disclosed above, wherein the layer (LO-1) and/or (LO-2) additionally comprise a zeolite.

Typically, any known zeolite can be used. The zeolite can be a natural or synthetic zeolite such as faujasite, chabazite, clinoptilolite, mordenite, silicalite, zeolite X, zeolite Y, ultrastable zeolite Y, ZSM-5 zeolite, ZSM-12 zeolite, SSZ-3 zeolite, SAPO 5 zeolite, offretite, or a beta zeolite. Preferred zeolite adsorbent materials have a high silica to alumina ratio. The zeolites may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. Preferred zeolites include ZSM, Y and beta zeolites. A particularly preferred adsorbent may comprise a beta zeolite of the type disclosed in U.S. Pat. No. 6,171,556. The zeolite loading should not be smaller than 0.3 $g/in^3$ in order to guarantee sufficient HC storage capacity and to prevent a premature release of stored paraffins during the temperature ramp following low temperature storage. Preferably, zeolite content is in the range of 0.4 to 0.7 $g/in^3$. A premature release of aromatics and paraffins from the zeolite may cause a delay in the CO and HC light-off.

Preferably, the zeolite used for the catalyst composition has a pore size from 0.3 to 1.0 nm.

In one embodiment, the one or more zeolites may be stabilized by ion exchange with a rare earth metal. In another embodiment, the washcoat layer(s) of the present invention may include one or more rare earth oxides (e.g., ceria) to promote the oxidation of heavy HCs.

The catalyst composition of the present invention, i.e. the diesel oxidation catalysts or the catalyzed soot filter of the present invention can be prepared by any suitable method.

The composition of each layer of the catalyst composition of the present invention can be applied to the substrate surfaces by any known means in the art. For example, the catalyst composition can be applied by spray coating, powder coating, or brushing or dipping a surface into the catalyst composition.

In particular, the individual layers can be applied by any suitable method and after one layer has been applied, preferably a drying step or a drying and a calcination step are applied before the next layer is applied.

According to the present invention, each layer can be applied on the substrate or a layer below completely or in form of a zone covering the substrate or layer below in an amount of about 10 to 100% of the length of the substrate or layer below. The remaining uncovered part of the substrate or layer can be covered with another layer. For the uses as diesel oxidation catalyst, such a zone covers preferably 50 to 100% of the length of the lower substrate or layer, more preferably 90 to 100%, for example 100%. For the uses as catalyzed soot filter, such a zone covers preferably 10 to 50% of the length of the lower substrate or layer, more preferably 50%.

The present invention is also directed to a method for treating diesel engine exhaust gas stream emissions containing unburned hydrocarbons (HC) and carbon monoxides (CO). An exhaust gas stream from a diesel engine can be treated in an emission treatment device containing the catalyst composition of the present invention, i.e. the diesel oxidation catalysts or the catalyzed soot filter of the present invention. In accordance with the present invention, the exhaust gas stream first comes into contact with the top layer and subsequently comes into contact with the lower layer(s).

During operation, exhaust gaseous emissions from a lean burn engine comprising hydrocarbons, carbon monoxide, nitrogen oxides, and sulfur oxides initially encounter the top layer, and thereafter encounter the lower layer(s).

During soot removal from CSF by an active regeneration CO is emitted from soot burning. These secondary emissions initially encounter the top layer, and thereafter encounter the lower layer(s).

During operation, exhaust gases flow through the catalyst composition from the upstream edge to the down stream edge. The catalytically active components contained in the layers oxidize HC and CO pollutants contained in the exhaust gases.

According to one embodiment, the present invention is also directed to a method for treating a diesel exhaust gas stream, the method comprising the steps of:
  (i) providing a diesel oxidation catalyst at least comprising:
    (a) a carrier substrate;
    (b) at least one layer (LO) comprising at least one oxygen storage compound;
    (c) at least one layer (LC) comprising at least one catalytically active PGM component; and
  (ii) contacting said diesel exhaust gas stream with said diesel oxidation catalyst for the treatment of exhaust gas emissions.

According to another embodiment, the present invention is also directed to a method for treating a diesel exhaust gas stream, the method comprising the steps of:
  (i) providing catalyzed soot filter at least comprising:
    (a) a carrier substrate;
    (b) at least one layer (LO) comprising at least one oxygen storage compound;
    (c) at least one layer (LC) comprising at least one catalytically active PGM component; and
  (ii) contacting said diesel exhaust gas stream with said catalyzed soot filter for the treatment of exhaust gas emissions.

Suitable embodiments of the catalyst composition of the present invention, i.e. the diesel oxidation catalysts or the catalyzed soot filter for the method of the present invention are disclosed above.

Thus, according to one embodiment, the present invention is also directed to a method as disclosed above, wherein the catalyst composition comprises two layers (LO-1) and (LO-2) comprising at least one oxygen storage compound.

The catalyst composition of the present invention, i.e. the diesel oxidation catalysts or the catalyzed soot filter of the present invention can be used in an integrated emission treatment system comprising one or more additional components for the treatment of diesel exhaust gas emissions. For example, the emission treatment system may comprise a diesel oxidation catalyst according to the present invention and may further comprise a soot filter component and/or a selective catalytic reduction (SCR) component. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but is preferably located downstream from the diesel oxidation catalyst. In a preferred embodiment, the soot filter is a catalyzed soot filter (CSF). Any suitable CSF can be used according to the present invention. However, it is also possible to combine the DOC according to the present invention with a CSF according to the present invention.

Preferably, the CSF of the present invention comprises a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. However, preferably the soot burning catalyst is an oxidation catalyst comprising one or more precious metal (PM) catalysts (platinum, palladium, and/or rhodium).

According to another embodiment, it is also possible to combine a conventional DOC known to the person skilled in the art with a CSF according to the present invention.

The exhaust gas treatment system of the present invention may further comprise a selective catalytic reduction (SCR) component. The SCR component may be located upstream or downstream of the DOC and/or soot filter. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 and U.S. Pat. No. 5,516,497. Suitable compositions include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

The exhaust gas treatment system of the present invention may further comprise a NOx-trap. The NOx-trap may be located upstream or downstream of the DOC and/or soot filter. Preferably, the NOx-trap is located downstream of a soot filter component. According to the present invention, any suitable NOx-trap can be used.

Before describing several exemplary embodiments of the invention, it is to be understood that the invention is not limited to the details of construction or process steps set forth in the following description. The invention is capable of other embodiments and of being practiced in various ways. In the following, preferred designs for the layered catalyst are provided, including such combinations as recited used alone or in unlimited combinations, the uses for which include systems and methods of other aspects of the present invention.

In embodiment 1, provided is a catalyst composition for the treatment of exhaust gas emissions from a diesel engine at least comprising: (a) a carrier substrate; (b) at least one layer (LO) comprising at least one oxygen storage compound; (c) at least one layer (LC) comprising at least one catalytically active PGM component.

In the following, preferred designs for the layered catalyst are provided, including such combinations as recited used alone or in unlimited combinations, the uses for which include systems and methods of other aspects of the present invention.

2. The catalyst composition according to embodiment 1, wherein the catalyst is a diesel oxidation catalyst.

3. The catalyst composition according to embodiment 1, wherein the catalyst is a catalyzed soot filter.

4. The catalyst composition of any of embodiments 1 to 3, wherein the catalyst composition comprises two layers (LO-1) and (LO-2) comprising at least one oxygen storage compound.

5. The catalyst composition of any of embodiments 1 to 4, at least comprising: (a) a carrier substrate; (b) a layer (LO-1) comprising at least one oxygen storage compound coated on said carrier substrate; (c) a layer (LC) comprising at least one catalytically active PGM component coated over said layer (LO-1); (d) a layer (LO-2) comprising at least one oxygen storage compound coated over said layer (LC).

6. The catalyst composition of any of embodiments 1 to 5, wherein the catalytically active component is at least one metal of the platinum group metals.

7. The catalyst composition of any of embodiments 1 to 6, wherein the catalytically active component contains Pt and Pd.

8. The catalyst composition of any of embodiments 1 to 7, wherein the layer (LC) comprises Pt and Pd in a ratio Pt/Pd of from 0.1/1 to 10/1.

9. The catalyst composition of any of embodiments 1 to 8, wherein the layer (LC) comprises Pt and Pd in a ratio Pt/Pd of from 1.5/1 to 2.5/1.

10. The catalyst composition of any of embodiments 1 to 4, wherein the layer (LO) additionally comprises Pt or Pd or Pt and Pd.

11. The catalyst composition of any of embodiments 5 to 9, wherein the layer (LO-2) additionally comprises Pt or Pd or Pt and Pd.

12. The catalyst composition of any of embodiments 5 to 9, wherein the layer (LO-1) additionally comprises Pd.

13. The catalyst composition of any of embodiments 1 to 12, wherein the oxygen storage compound comprises $ZrO2$ and/or $CeO2$.

14. The catalyst composition of any of embodiments 1 to 13, wherein the oxygen storage compound comprises OSC modifier including a least one of Y, La, Nd, Sm, Pr, and Hf and mixtures thereof.

15. The catalyst composition of any of embodiments 1 to 4, wherein the layer (LO), the layer (LC), or both additionally comprise a zeolite.

16. The catalyst composition of any of embodiments 5 to 14, wherein the layer (LO-1) additionally comprises a zeolite.

17. The catalyst composition of any of embodiments 5 to 14, wherein the layer (LO-2) additionally comprises a zeolite.

18. The catalyst composition of any of embodiments 1 to 17, wherein the layer (LC) additionally comprises a zeolite.

19. A method for treating a diesel exhaust gas stream, the method comprising the steps of: (i) providing a diesel oxidation catalyst at least comprising: (a) a carrier substrate; (b) at least one layer (LO) comprising at least one oxygen storage compound; (c) at least one layer (LC) comprising at least one catalytically active PGM component; and (ii) contacting said diesel exhaust gas stream with said diesel oxidation catalyst for the treatment of exhaust gas emissions.

20. A method for treating a diesel exhaust gas stream, the method comprising the steps of: (i) providing catalyzed soot filter at least comprising: (a) a carrier substrate; (b) at least one layer (LO) comprising at least one oxygen storage compound; (c) at least one layer (LC) comprising at least one catalytically active PGM component; and (ii) contacting said diesel exhaust gas stream with said catalyzed soot filter for the treatment of exhaust gas emissions.

21. The method according to embodiment 19 or 20, wherein the catalyst composition comprises two layers (LO-1) and (LO-2) comprising at least one oxygen storage compound.

Other specific designs can be used alone or in combination with the layered diesel oxidation catalyst composites according to the present invention as follows:

the catalytic material comprises the palladium component in an amount in the range of to 75 g/ft3 (0.18 to 2.65 kg/m3);

the catalytic material further comprises a platinum component, in the range of 10 g/ft3 to 150 g/ft3 (0.35 to 5.30 kg/m3), an amount of up to 20% by weight of the platinum component being incorporated into the at least one molecular sieve, and an amount of at least 80% by weight of the platinum component being on the high surface area, refractory metal oxide support of the palladium-containing layer;

the palladium-containing layer comprises Pt and Pd in a ratio Pt/Pd of from 0.1/1 to 10/1; or, more specifically, the ratio is 1.5/1 to 2.5/1;

the oxygen storage component comprises ZrO2, CeO2, or both.

the oxygen storage component comprises OSC modifier including a least one of Y, La, Nd, Sm, Pr, and mixtures thereof.

a total precious metal component loading in an amount in the range of 15 to 225 g/ft3 (0.53 to 7.95 kg/m3);

the palladium-containing layer is located on the carrier and the hydrocarbon trap layer is located on the palladium-containing layer;

the hydrocarbon trap layer is located on the carrier and the palladium-containing layer is located on the hydrocarbon trap layer;

the undercoat layer that comprises a high surface area refractory metal oxide;

the undercoat layer that comprises a palladium component;

the undercoat layer and the hydrocarbon trap layer both independently comprise an oxygen storage component;

the carrier is a flow-through substrate, or a wall-flow substrate to provide a catalyzed soot filter;

the palladium-containing layer is located on the undercoat layer and the hydrocarbon trap layer is located on the palladium-containing layer, wherein the hydrocarbon trap layer comprises a beta zeolite, gamma alumina, and platinum; the palladium-containing layer further comprises platinum and gamma alumina, and the Pt/Pd ratio is in the range of 4/1 to 1/2; and the undercoat layer comprises gamma alumina, and optionally palladium.

the catalytic material is substantially free of base metals in quantities suitable for NOx (nitrogen oxides) storage; such base metals include, but are not limited to, Ba, Mg, K, and La, and the like;

the catalytic material is free of rhodium;

The present invention is further illustrated by way of the following examples.

EXAMPLES

1. Catalyst Preparation 1.1 120 g/ft$^3$ 1/1 (Pt/Pd Technology with OSC): (Sample A)

For the 1$^{st}$ (bottom) layer a Palladium nitrate solution was added to 0.75 g/in$^3$ high porous γ-alumina resulting in 30 g/ft$^3$ Pd. The resulting frit was dispersed in water and acid (e.g. acetic acid). Into this slurry 0.75 g/in$^3$ OSC material (ZrO$_2$: 45. wt %, CeO$_2$: 45 wt %, La$_2$O$_3$: 8 wt %, Pr$_6$O$_{11}$: 2 wt %) was dispersed and milled to a particle size d$_{90}$ of 7 micrometer. The final slurry was coated onto a monolith, dried at 110° C. air and calcined at 450° C. in air.

For the 2$^{nd}$ (middle) layer 1.5 g/in$^3$ of high porous γ-alumina was impregnated with an aqueous solution of Palladium nitrate giving a final dry Pd content of 30 g/ft$^3$. The resulting powder was dispersed in water. Platinum solution with Platinum as an ammine stabilized Pt complex was added to give a dry content of Pt 52 g/ft$^3$. After adjusting the pH of the slurry to 4.5 the slurry was milled to a particle size d$_{90}$ of 16 μm. The slurry is then subsequently coated onto the 1$^{st}$ layer, dried at 110° C. air and calcined at 450° C. in air.

For the 3$^{rd}$ (top) layer 0.25 g/in$^3$ high porous γ-alumina, 0.5 g/in$^3$ OSC material (ZrO$_2$: 45 wt %, CeO$_2$: 45 wt %, La$_2$O$_3$: 8 wt %, Pr$_6$O$_{11}$: 2 wt %), 0.5 g/in$^3$H-beta zeolite and platinum as an ammine stabilized Pt complex to give a content of 8 g/ft$^3$ Platinum were dispersed in water and acid (e.g. acetic acid). This slurry was milled to a particle size d$_{90}$ of 15 μm and subsequently coated onto a monolith, dried at 110° C. air and calcined at 450° C. in air.

1.2 120 g/ft$^3$ 2/1 (Pt/Pd Technology with OSC): Sample B)

For the 1$^{st}$ (bottom) layer 0.25 g/in$^3$ high porous γ-alumina and 0.75 g/in$^3$ OSC material (ZrO$_2$: 45 wt %, CeO$_2$: 45 wt %, La$_2$O$_3$: 8 wt %, Pr$_6$O$_{11}$: 2 wt %) were dispersed in water and acid (e.g. acetic acid) and milled to a particle size d$_{90}$ of 8 micrometer. The final slurry was coated onto a monolith, dried at 110° C. air and calcined at 450° C. in air.

For the 2$^{nd}$ (middle) layer 1.5 g/in$^3$ of high porous γ-alumina was impregnated with an aqueous solution of Palladium nitrate giving a final dry Pd content of 40 g/ft$^3$. The resulting powder was dispersed in water. Platinum solution with Platinum as an ammine stabilized Pt complex was added to give a dry content of Pt 72 g/ft$^3$. After adjusting the pH of the slurry to 4.5 the slurry was milled to a particle size d$_{90}$ of 16 μm. The slurry is then subsequently coated onto the 1$^{st}$ layer, dried at 110° C. air and calcined at 450° C. in air.

For the 3$^{rd}$ (top) layer 0.25 g/in$^3$ high porous γ-alumina, 0.5 g/in$^3$ OSC material (ZrO$_2$: 45 wt %, CeO$_2$: 45 wt %, La$_2$O$_3$: 8 wt %, Pr$_6$O$_{11}$: 2 wt %), 0.5 g/in$^3$H-beta zeolite and platinum as an ammine stabilized Pt complex to give a content of 8 g/ft$^3$ Platinum were dispersed in water and acid (e.g. acetic acid). This slurry was milled to a particle size $d_{90}$ of 15 μm and subsequently coated onto a monolith, dried at 110° C. air and calcined at 450° C. in air.

1.3 120 g/ft³ 2/1 (Pt/Pd Technology without OSC, Comparative Example): Sample C)

For the 1st (bottom) layer 1 g/in³ high porous γ-alumina was dispersed in water and acid (e.g. acetic acid) and milled to a particle size $d_{90}$ of 15 micrometer. The final slurry was coated onto a monolith, dried at 110° C. air and calcined at 450° C. in air.

For the 2nd (middle) layer 1.5 g/in³ of high porous γ-alumina was impregnated with an aqueous solution of Palladium nitrate giving a final dry Pd content of 40 g/ft³. The resulting powder was dispersed in water. Platinum solution with Platinum as an ammine stabilized Pt complex was added to give a dry content of Pt 72 g/ft³. After adjusting the pH of the slurry to 4.5 the slurry was milled to a particle size $d_{90}$ of 16 μm. The slurry is then subsequently coated onto the 1st layer, dried at 110° C. air and calcined at 450° C. in air.

For the 3rd (top) layer 0.25 g/in³ high porous γ-alumina, H-beta zeolite and platinum as an ammine stabilized Pt complex to give a content of 8 g/ft³ Platinum were dispersed in water and acid (e.g. acetic acid). This slurry was milled to a particle size $d_{90}$ of 15 μm and subsequently coated onto a monolith, dried at 110° C. air and calcined at 450° C. in air.

2. Comparison of State of the Art Catalyst Technologies with Invention Technology (Testing of HC/CO Gas Activity Performance)

Test Samples 2.1 Sample A:
A three layer catalyst was tested comprising of:
1st Layer: 30 g/ft³ Pd, 0.75 g/in³ OSC, 0.75 g/in³ high porous γ-alumina
2nd Layer: 52 g/ft³ Pt, 30 g/ft³ Pd, 1.5 g/in³ high porous γ-alumina
3rd Layer: 8 g/ft³ Pt, 0.25 g/in³ high porous γ-alumina, 0.5 g/in³ H-Beta zeolite, 0.5 g/in³ OSC 2.2 Sample B
A three layer catalyst was tested comprising of:
1st Layer: 0.75 g/in³ OSC, 0.25 g/in³ high porous γ-alumina
2nd Layer: 72 g/ft³ Pt, 40 g/ft³ Pd, 1.5 g/in³ high porous γ-alumina
3rd Layer: 8 g/ft³ Pt, 0.25 g/in³ high porous γ-alumina, 0.5 g/in³ H-Beta zeolite, 0.5 g/in³ OSC 2.3 Sample C: (Comparative)
A three layer catalyst was tested comprising of:
1st Layer: 1 g/in³ high porous γ-alumina
2nd Layer: 72 g/ft³ Pt, 40 g/ft³ Pd, 1.5 g/in³ high porous γ-alumina
3rd Layer: 8 g/ft³ Pt, 0.25 g/in³ high porous γ-alumina, 0.5 g/in³ H-Beta zeolite 3. Test Procedures (Light-Off Performance Testing)

Samples A), B) and C) were tested for CO and HC light-off performance. Prior testing, the samples were aged in the exhaust stream of a 4 cylinder light duty diesel engine with 2.7 L engine displacement for 25 h. The temperature of the exhaust stream was raised using an upstream burner-DOC such that the catalysts were aged to 750° C. steady state.

For light-off testing each sample was placed downstream in the exhaust line from a 6 cylinder light duty diesel engine with 3 L displacement. The CO and HC concentration in the exhaust stream was constant at 1500 ppm and 350 ppm ($C_3$ basis), respectively. The gas flow under standard conditions was approximately 50 m³/h. The temperature ramp was 2° C./min.

A lower light-off temperature characterizes a better gas activity.

3.1 The CO Light-Off Curves for Samples A), B) and C) are Shown in FIG. 1. the CO Conversion (in %, y-axis) is Shown in Dependency of the Temperature (in ° C., x-axis).

Samples A) and B) show CO light-off at lower temperatures compared to Sample C). Pd costs are approx. 4 times lower than Pt. Therefore sample A) with Pt/Pd ratio of 1/1 has lower precious metal costs (15-20%) than samples B) and C) (Pt/Pd=2/1).

Figure 2:
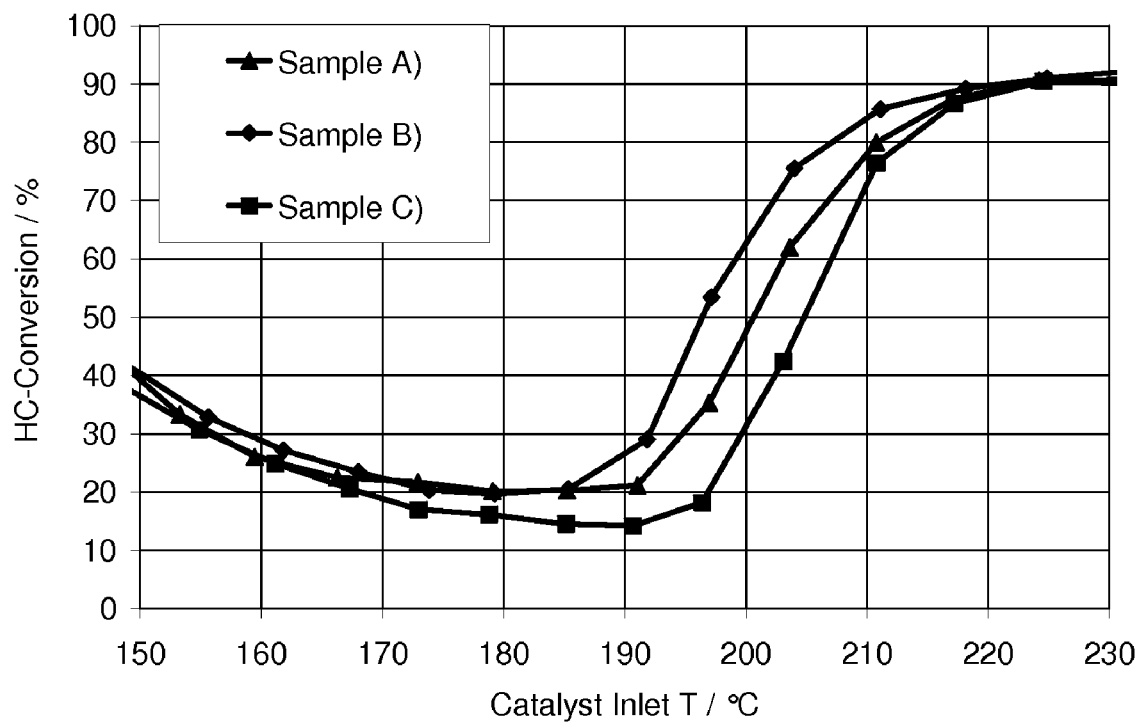
FIG. 2 provides a graph of hydrocarbon conversion data.

3.2 The HC Light-Off Curves for Samples A), B) and C) are Shown in FIG. 2. the Hydrocarbon Conversion (in %, y-axis) is Shown in Dependency of the Catalyst Inlet Temperature (in ° C., x-axis)

Samples A) and B) show HC light-off at lower temperatures compared to Sample C). Pd costs are approx. 4 times lower than Pt. Therefore sample A) with Pt/Pd ratio of 1/1 has lower precious metal costs than samples B) and C) (Pt/Pd=2/1).

3.3 The HC/CO Light-Off Temperatures for Samples A), B) and C) are Shown in Table 1

Precious metal cost reduced sample A) shows 4-5° C. lower CO T (50%) and HC T (70%) compared to Reference sample C). Sample B) shows 7-8° C. lower CO T (50%) and HC T (70%) compared to Reference sample C).

TABLE 1

|  | HC, $T_{70}$ ° C. | CO, $T_{50}$ ° C. |
|---|---|---|
| Sample A) | 207 | 195 |
| Sample B) | 202 | 191 |
| Sample C) COMPARATIVE | 209 | 199 |

What is claimed is:

1. A layered diesel oxidation catalyst composite for the treatment of exhaust gas emissions from a diesel engine comprising: a diesel oxidation catalytic material a carrier, the catalytic material comprising a palladium component, and at least two layers:
    a hydrocarbon trap layer comprising at least one molecular sieve, the hydrocarbon trap layer being substantially free of palladium;
    a palladium-containing layer that comprises the palladium component, and is substantially free of a molecular sieve and is substantially free of an oxygen storage component, wherein the palladium component is located on a high surface area, refractory metal oxide support;
    wherein the catalytic material optionally further comprises an undercoat layer located on the carrier and below the at least two layers; and
        wherein the catalytic material further comprises an oxygen storage component that is located in at least one of the hydrocarbon trap and the optional undercoat layers.

2. The layered catalyst composite of claim 1, wherein the catalytic material comprises the palladium component in an amount in the range of 5 to 75 g/ft³ (0.18 to 2.65 kg/m³).

3. The layered catalyst composite of claim 1, wherein the catalytic material further comprises a platinum component, in the range of 10 g/ft³ to 150 g/ft³ (0.35 to 5.30 kg/m³), an amount of up to 20% by weight of the platinum component being incorporated into the at least one molecular sieve, and an amount of at least 80% by weight of the platinum component being on the high surface area, refractory metal oxide support of the palladium-containing layer.

4. The layered catalyst composite of claim 1, wherein the palladium-containing layer comprises Pt and Pd in a ratio Pt/Pd of from 0.1/1 to 10/1.

5. The layered catalyst composite of claim 4, wherein the ratio is 1.5/1 to 2.5/1.

6. The layered catalyst composite of claim 1, wherein the oxygen storage component comprises $ZrO_2$, $CeO_2$, or both.

7. The layered catalyst composite of claim 6, wherein the oxygen storage component comprises OSC modifier including a least one of Y, La, Nd, Sm, Pr, and mixtures thereof.

8. The layered catalyst composite of claim 1 having a total precious metal component loading in an amount in the range of 15 to 225 g/ft$^3$ (0.53 to 7.95 kg/m$^3$).

9. The layered catalyst composite of claim 1, wherein the palladium-containing layer is located on the carrier and the hydrocarbon trap layer is located on the palladium-containing layer.

10. The layered catalyst composite of claim 1, wherein the hydrocarbon trap layer is located on the carrier and the palladium-containing layer is located on the hydrocarbon trap layer.

11. The layered catalyst composite of claim 1 comprising the undercoat layer that comprises a high surface area refractory metal oxide.

12. The layered catalyst composite of claim 1 comprising the undercoat layer that comprises a palladium component.

13. The layered catalyst of claim 1, comprising the undercoat layer, wherein the undercoat layer and the hydrocarbon trap layer both independently comprise an oxygen storage component.

14. The layered catalyst composite of claim 1, wherein the carrier is a flow-through substrate.

15. The layered catalyst composite of claim 1, wherein the carrier is a wall-flow substrate to provide a catalyzed soot filter.

16. The layered catalyst composite of claim 1 comprising the undercoat layer, wherein the palladium-containing layer is located on the undercoat layer and the hydrocarbon trap layer is located on the palladium-containing layer, wherein the hydrocarbon trap layer comprises a beta zeolite, gamma alumina, and platinum;

the palladium-containing layer further comprises platinum and gamma alumina, and the Pt/Pd ratio is in the range of 4/1 to 1/2; and the undercoat layer comprises gamma alumina, and optionally palladium.

17. A method of treating a gaseous exhaust stream of a diesel engine, the exhaust stream including hydrocarbons, carbon monoxide, and other exhaust gas components, the method comprising: contacting the exhaust stream with the layered diesel oxidation catalyst composite of claim 1.

18. The method of claim 17, wherein the catalytic material further comprises the palladium component in an amount in the range of 5 to 75 g/ft$^3$ (0.18 to 2.65 kg/m$^3$) and a platinum component, in the range from 10 g/ft$^3$ to 150 g/ft$^3$ (0.35 to 5.30 kg/m$^3$), an amount of up to 10% by weight of the platinum component being incorporated into the at least one molecular sieve, and an amount of at least 90% by weight of the platinum component being on the high surface area, refractory metal oxide support of the palladium-containing layer.

19. The method of claim 17, further comprising directing the diesel exhaust gas stream one or more to a soot filter located downstream of the diesel oxidation catalyst composite and a selective catalytic reduction (SCR) catalytic article located upstream or downstream of the catalyzed soot filter (CSF).

20. A system for treatment of a diesel engine exhaust stream including hydrocarbons, carbon monoxide, and other exhaust gas components, the emission treatment system comprising:

an exhaust conduit in fluid communication with the diesel engine via an exhaust manifold;

the diesel oxidation catalyst composite of claim 1 wherein the carrier is a flow through substrate or a wall-flow substrate; and one or more of the following in fluid communication with the composite: a soot filter, a selective catalytic reduction (SCR) catalytic article and a NOx storage and reduction (NSR) catalytic article.

* * * * *